(12) United States Patent
Ng

(10) Patent No.: US 8,566,431 B2
(45) Date of Patent: Oct. 22, 2013

(54) IDENTIFICATION DEVICE AND METHOD FOR DEVICE IDENTIFICATION

(75) Inventor: Chern Ann Ng, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 701 days.

(21) Appl. No.: 12/015,316

(22) Filed: Jan. 16, 2008

(65) Prior Publication Data

US 2009/0182852 A1 Jul. 16, 2009

(51) Int. Cl.
*G06F 15/16* (2006.01)
*G06F 15/173* (2006.01)
*G06F 15/177* (2006.01)

(52) U.S. Cl.
USPC .......... 709/222; 709/217; 709/224; 709/245; 709/248

(58) Field of Classification Search
USPC .......... 709/203, 217–224, 227, 245, 248, 249
See application file for complete search history.

(56) References Cited

U.S. PATENT DOCUMENTS

| | | | | |
|---|---|---|---|---|
| 5,642,110 A * | 6/1997 | Raasch et al. | ............... | 341/26 |
| 5,973,964 A * | 10/1999 | Tobita et al. | ............. | 365/185.33 |
| 6,606,031 B2 * | 8/2003 | Olson | ...................... | 340/815.65 |
| 6,622,179 B2 * | 9/2003 | Welder | ............................. | 710/15 |
| 6,871,213 B1 * | 3/2005 | Graham et al. | ............... | 709/205 |
| 6,944,606 B2 * | 9/2005 | Schmit et al. | ................... | 706/60 |
| 6,992,656 B2 * | 1/2006 | Hughes | .......................... | 345/163 |
| 7,143,067 B1 * | 11/2006 | Cheston et al. | ................. | 705/59 |
| 7,168,003 B2 * | 1/2007 | Lozano et al. | ................... | 714/25 |
| 7,334,735 B1 * | 2/2008 | Antebi et al. | .................. | 235/492 |
| 7,336,383 B2 * | 2/2008 | Kageyama | .................... | 358/1.15 |
| 7,392,310 B2 * | 6/2008 | Motoyama et al. | ........... | 709/224 |
| 7,398,524 B2 * | 7/2008 | Shapiro | ......................... | 717/175 |
| 7,415,547 B1 * | 8/2008 | Naborskyy et al. | ............. | 710/15 |
| 7,415,721 B2 * | 8/2008 | Fransdonk | ......................... | 726/4 |
| 7,421,466 B2 * | 9/2008 | Haines | ........................... | 709/200 |
| 7,444,210 B2 * | 10/2008 | Breed et al. | ......................... | 701/1 |
| 7,463,637 B2 * | 12/2008 | Bou-Diab et al. | ............. | 370/401 |
| 7,483,438 B2 * | 1/2009 | Serghi et al. | ................... | 370/401 |
| 7,512,671 B1 * | 3/2009 | Gladwin et al. | .............. | 709/219 |
| 7,516,175 B1 * | 4/2009 | Greene | ......................... | 709/201 |
| 7,536,695 B2 * | 5/2009 | Alam et al. | .................... | 719/313 |
| 7,565,351 B1 * | 7/2009 | Callaghan | .......................... | 707/8 |
| 7,565,650 B2 * | 7/2009 | Bhogal | ......................... | 717/178 |
| 7,587,467 B2 * | 9/2009 | Hesselink et al. | ............. | 709/214 |
| 7,610,349 B1 * | 10/2009 | Swinton et al. | ................ | 709/216 |
| 7,629,963 B1 * | 12/2009 | Wright | .............................. | 345/168 |
| 7,646,316 B2 * | 1/2010 | Khoo | ............................... | 341/22 |
| 7,647,385 B2 * | 1/2010 | Encarnacion et al. | ......... | 709/217 |

(Continued)

*Primary Examiner* — Melvin H Pollack
(74) *Attorney, Agent, or Firm* — McDonnell Boehnen Hulbert & Berghoff LLP

(57) ABSTRACT

A device having a unique identification or an identifier for uniquely identifying the device. The unique identification can be a series of alphanumeric characters, a series of numeric characters or letters of the alphabet. The device further comprises a storage module for storing the unique identification. The device also comprises a controller for establishing communication with a computing system over a network when the device is coupled to the network. The device has an address on the network, also known as a network address, when coupled thereto. The network address and the unique identification are transmittable by the controller to the computing system upon communication being established with computing system. The controller comprises a processor and a network access module for facilitating coupling of the device to the network. The device is able to receive data from the computing system, the data storable in the storage module.

55 Claims, 4 Drawing Sheets

(56) References Cited

U.S. PATENT DOCUMENTS

| | | | |
|---|---|---|---|
| 7,673,032 B1* | 3/2010 | Augart | 709/223 |
| 7,707,573 B1* | 4/2010 | Marmaros et al. | 717/178 |
| 7,720,569 B2* | 5/2010 | Forrester et al. | 700/241 |
| 7,809,857 B2* | 10/2010 | Anderson et al. | 709/245 |
| 7,853,946 B2* | 12/2010 | Minagawa | 717/178 |
| 7,938,524 B2* | 5/2011 | Silverbrook | 347/93 |
| 8,099,502 B2* | 1/2012 | Genske et al. | 709/227 |
| 8,106,742 B2* | 1/2012 | Marshall et al. | 340/4.3 |
| 8,140,658 B1* | 3/2012 | Gelvin et al. | 709/224 |
| 8,155,877 B2* | 4/2012 | Baudisch et al. | 701/300 |
| 8,204,972 B2* | 6/2012 | Benfield et al. | 709/223 |
| 8,282,475 B2* | 10/2012 | Nguyen et al. | 463/29 |
| 2002/0198729 A1* | 12/2002 | Burkes et al. | 705/1 |
| 2003/0028403 A1* | 2/2003 | Olson | 705/4 |
| 2003/0200280 A1* | 10/2003 | Austin | 709/217 |
| 2006/0035590 A1* | 2/2006 | Morris et al. | 455/41.2 |
| 2006/0070089 A1* | 3/2006 | Shoaib et al. | 719/321 |
| 2006/0209028 A1* | 9/2006 | Ozolins | 345/168 |
| 2006/0288071 A1* | 12/2006 | Bigioi et al. | 709/203 |
| 2007/0146325 A1* | 6/2007 | Poston et al. | 345/163 |
| 2007/0233899 A1* | 10/2007 | Aborn | 709/245 |
| 2007/0245409 A1* | 10/2007 | Harris et al. | 726/5 |
| 2007/0266149 A1* | 11/2007 | Cobb et al. | 709/224 |
| 2007/0294341 A1* | 12/2007 | Shah et al. | 709/203 |
| 2008/0016223 A1* | 1/2008 | Hasegawa et al. | 709/227 |
| 2008/0104212 A1* | 5/2008 | Ebrom et al. | 709/222 |
| 2008/0192750 A1* | 8/2008 | Ko et al. | 370/395.3 |
| 2008/0300888 A1* | 12/2008 | Dell'Anno et al. | 705/1 |
| 2009/0064038 A1* | 3/2009 | Fleischman et al. | 715/810 |
| 2009/0183148 A1* | 7/2009 | Bagrecha | 717/171 |

* cited by examiner

IDENTIFICATION DEVICE AND METHOD FOR DEVICE IDENTIFICATION

FIELD OF INVENTION

The present invention relates generally to a computer peripheral device. More particularly, the present invention relates to a computer peripheral device having a unique identification and an extracted network address.

BACKGROUND

Most computers today allow for coupling with computer peripheral devices. Such computer peripheral devices include computer mice, handheld gaming consoles and joysticks. Known computer peripheral devices are typically interchangeable and can be used together with different computers and computer systems with minimal restrictions. Computer operating systems such as Microsoft Windows™ are generally adapted to recognize many different coupled computer peripheral devices, including computer mice, without requiring any special installations. Such computer operating systems are able to automatically configure the coupled computer peripheral device for use with the modern computer operating system.

Computer peripheral devices are generally distributed all over the world. Even though each computer peripheral device typically has its own serial number, it is often difficult for a company to keep track of the computer peripheral device's location or whereabouts after it is distributed from the company's warehouse or distribution center. It is also typically resource intensive for the company to verify international shipping orders of a large number of computer peripheral devices. Additionally, it is difficult for the company to track and prevent unwanted parallel imports of its distributed computer peripheral devices. This therefore results in a significant reduction of potential revenue for the company.

Additionally, activating, tracking and verifying of warranties for computer peripheral devices are considerably time and labor intensive activities for the company. Currently, a computer peripheral device is typically sold to a customer with a blank warranty card. Upon purchase, the customer fills in the blank warranty card with a purchase date and thereafter mails it to a warranty provider. The warranty provider is for example a manufacturer or a retailer of the computer peripheral device. Upon receipt of the warranty card bearing the purchase date, the warranty provider then records a warranty start date and activates a warranty validity period. This method of recording the warranty start date and activating the warranty validity period is often inaccurate because customers often provide an inaccurate or delayed date of purchase of the computer peripheral device. Therefore, the warranty validity period of the computer peripheral device is often unfairly extended.

US patent application, US2006146023, by Kidron Oren describes a computer mouse that comprises a unique identification, memory to store the unique identification and a mouse interface that facilitates controlled data transfer between a computer and the computer mouse coupled thereto. However, while the computer mouse as described in Kidron's patent application can be coupled or linked with the computer and subsequently identified by the computer, the company is unable to identify or track the computer mouse's location. Furthermore, the company or the warranty provider is neither able to accurately activate the warranty start date nor to keep track of the warranty validity period of the computer mouse described in Kidron's patent application.

In accordance with the aforementioned issues, there is an apparent need to allow companies to identify the location of distributed computer peripheral devices. There is also an unmet need to accurately activate warranty start dates and to track and verify warranty validity periods of computer peripheral devices.

SUMMARY

In accordance with a first aspect of the invention, there is disclosed a device comprising a storage module and an identifier stored on the storage module, the identifier for uniquely identifying the device. The device further comprises a controller for establishing communication with a computing system over a network when the device is coupled to the network. The controller is adapted for obtaining an address on the network when the device is coupled thereto. The address is associated with the device. The identifier and the address are transmittable by the controller to the computing system upon communication being established with the computing system.

In accordance with a second aspect of the invention, there is disclosed a device implemented method comprising providing an identifier. The identifier is unique for identifying the device. The method further comprises detecting connection between the device and a network. Communication is initiated between the device and a computing system upon connection of the device with the network. The method also comprises determining an address of the device on the network and then transmitting the address and the identifier to the computing system.

In accordance with a third aspect of the invention, there is disclosed a computer implemented method comprising detecting communication between a device and a computing system over a network. The method further comprises the computing system receiving an address and an identifier from the device. The identifier uniquely identifies the device and the address indicates a location of the device on the network. The address is obtainable by the device upon coupling thereof to the network. The method also comprises updating the address, the identifier and at least one of time and date of receipt of the address and the identifier on a database.

In accordance with a fourth aspect of the invention, there is disclosed a device-readable medium having stored therein a plurality of programming instructions, which when executed, the instructions cause the device to detect connection between the device and a network and to initiate communication between the device and a computing system on the network in response to the device being connected to the network. The plurality of programming instructions, which when executed, also enables the device to obtain an address of the device on the network, the address being associated with the device. The plurality of programming instructions when executed also causes the device to transmit the address and an identifier to the computing system, wherein the identifier is for uniquely identifying the device.

In accordance with a fifth aspect of the invention, there is disclosed a machine-readable medium having stored therein a plurality of programming instructions, which when executed, the instructions cause the machine to detect communication between a device over a network. The plurality of programming instructions, which when executed, the instructions also cause the machine to receive an address and an identifier from the device, the identifier for uniquely identifying the device and the address for indicating location of the device on the network. The address is obtainable by the device upon coupling thereof to the network. Furthermore, the plurality of programming instructions, which when executed, the instructions cause the machine to update a database with the address, the identifier and at least one of time and date of receipt of the address and the identifier.

BRIEF DESCRIPTION OF DRAWINGS

Embodiments of the invention are described hereinafter with reference to the following drawings in which.

DETAILED DESCRIPTION

Figure 1:
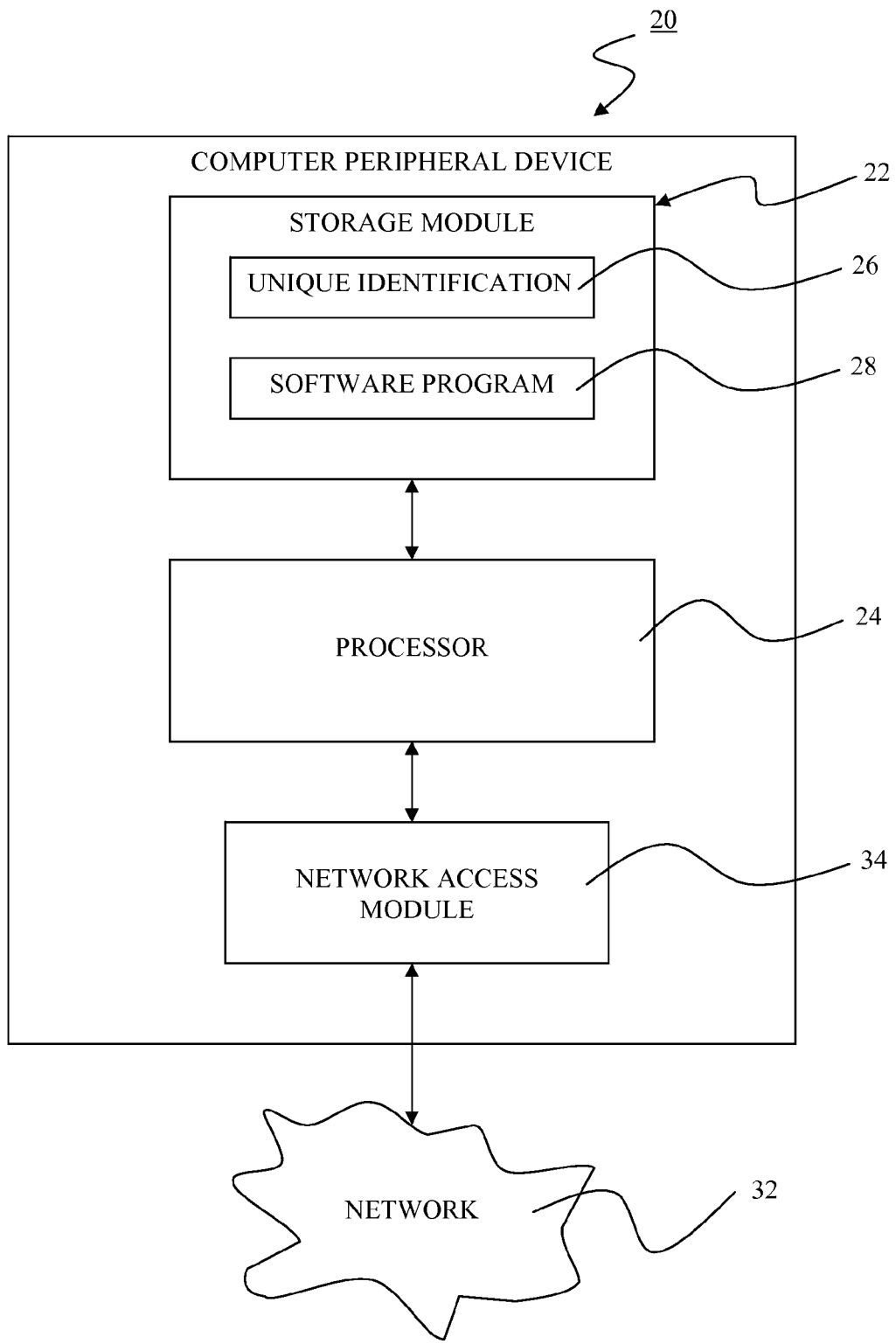
FIG. 1 is a block diagram illustrating a computer peripheral device according to an embodiment of the present invention.
Figure 2:
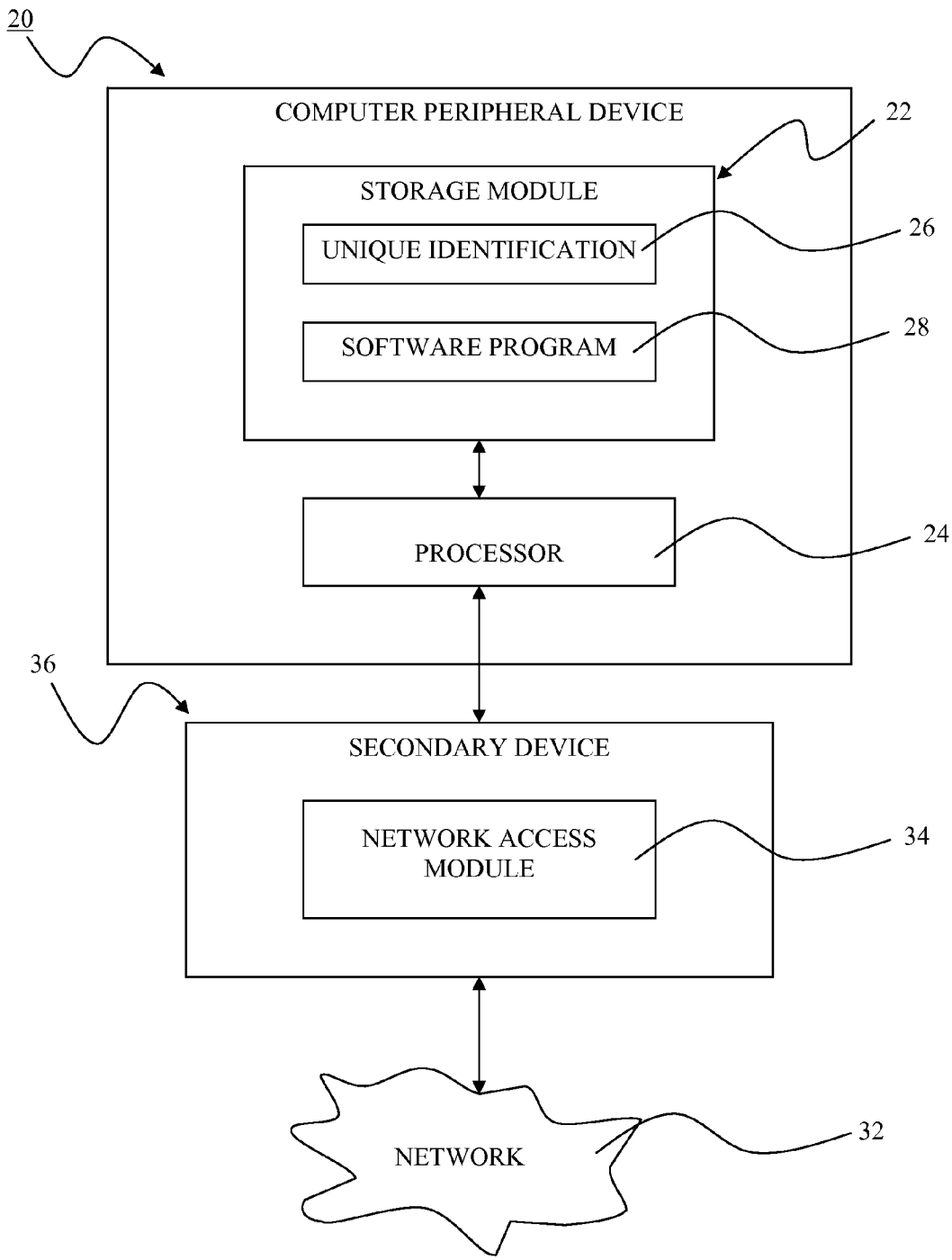
FIG. 2 is a block diagram illustrating a variation of the computer peripheral device of FIG. 1 according to the embodiment of the present invention.
Figure 3:
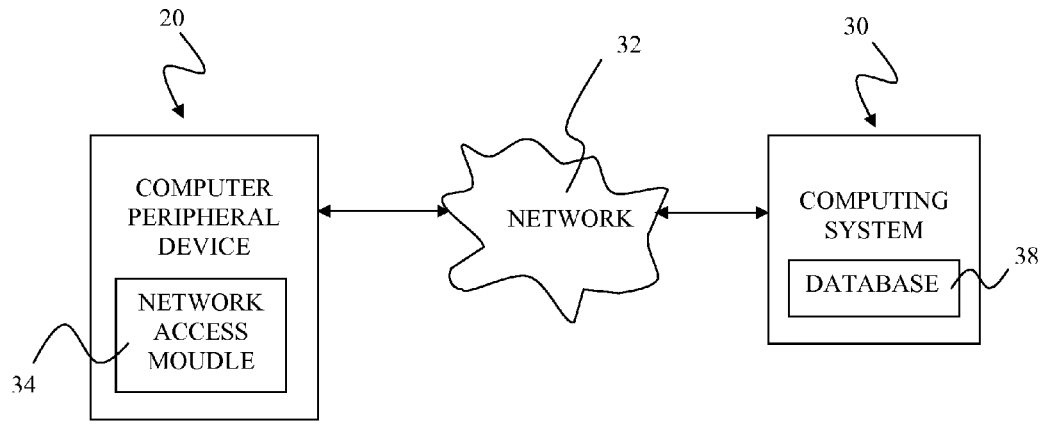
FIG. 3 illustrates a connection between the computer peripheral device of FIG. 1 and a computing system.
Figure 4:
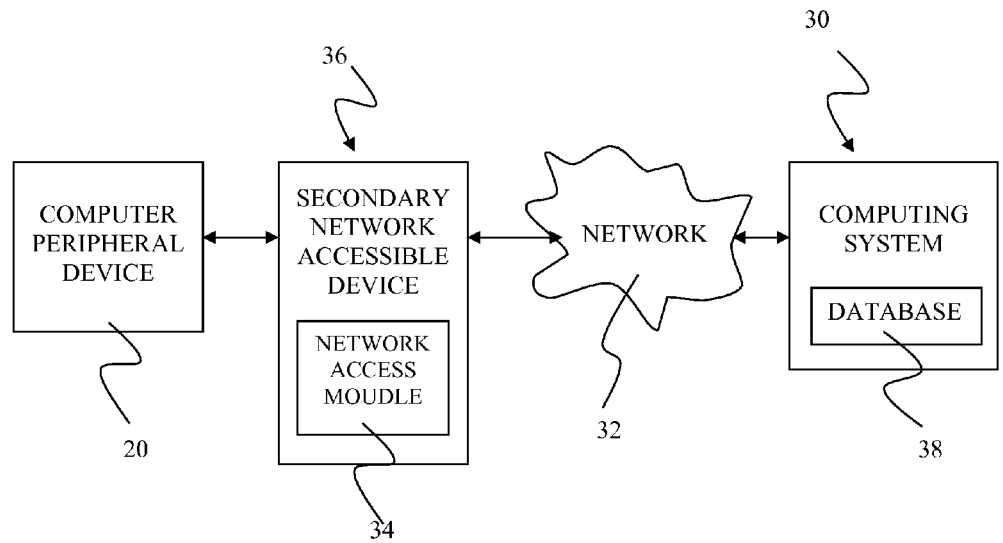
FIG. 4 illustrates another route of connection between the computer peripheral device of FIG. 2 and the computing system.

Computer peripheral devices such as computer mice are generally distributed all over the world. Although most computer peripheral devices are assigned a unique serial number for purposes of identification, it often remains difficult and resource intensive for a company to keep track of a location of each of a large number of distributed computer peripheral devices. Delayed activation of warranty dates, resulting in an unauthorized extension of warranty validity periods, is also a typical problem faced by a warranty provider. Tracking and verification of the warranty validity periods are often an inaccurate and a resource intensive process. Accordingly, there is a need to enable companies to easily and accurately identify the locations of distributed computer peripheral devices as well as keep track and verify the warranty validity periods of the said computer peripheral devices.

For purposes of brevity and clarity, descriptions of embodiments of the present invention are limited hereinafter to computer peripheral devices, for example computer mice. This however, does not preclude various embodiments of the invention in specific applications where fundamental principals prevalent among the various embodiments of the invention such as operational, functional or performance characteristics are required.

An exemplary embodiment of the invention, a peripheral device (PD) 20, is described hereinafter and shown in FIGS. 1, 2, 3 and 4.

The PD 20 as provided by the present invention is preferably communicable with a computer (not shown). The PD 20 is preferably a computer mouse communicable or couplable for use with the computer. The computer mouse has at least one actuator (not shown) being actuable for generating actuation signals. The computer mouse also has a displacement transducer (not shown) for detecting and transducing displacement into displacement signals. Alternatively, the PD 20 is a gaming console, a joystick or a keyboard connectable for use with the computer. The PD 20 preferably includes a storage module 22 and a processor 24 or controller.

Preferably the storage module 22 includes a solid state memory device. The storage module 22 stores a unique identification 26, also known as an identifier, and a software program 28. The unique identification 26 or identifier is preferably for uniquely identifying the PD 20. The unique identification 26 is for example a series of alphanumeric characters, a series of numeric characters or a series of letters.

The PD 20 communicates with a computing system 30 via a network 32. Preferably, the processor 24 or controller helps to establish communication with the computing system 30 via the network 32. The network 32 is preferably a local area network (LAN), a wide area network (WAN) or the Internet. The PD 20 accesses the network 32 via a network access module 34.

The network access module 34 can be housed within the PD 20, thereby allowing the PD 20 to independently access the network 32 and thereafter communicate with the computing system 30. The PD 20 preferably includes a socket for enabling connection of the network access module 34 to the network 32. Alternatively the network access module 34 is housed within a secondary device 36, for example the computer or a gaming console. In this alternative scenario, the PD 20 first connects with the secondary device 36 before accessing the network 32 to thereafter communicate with the computing system 30.

Figure 5:
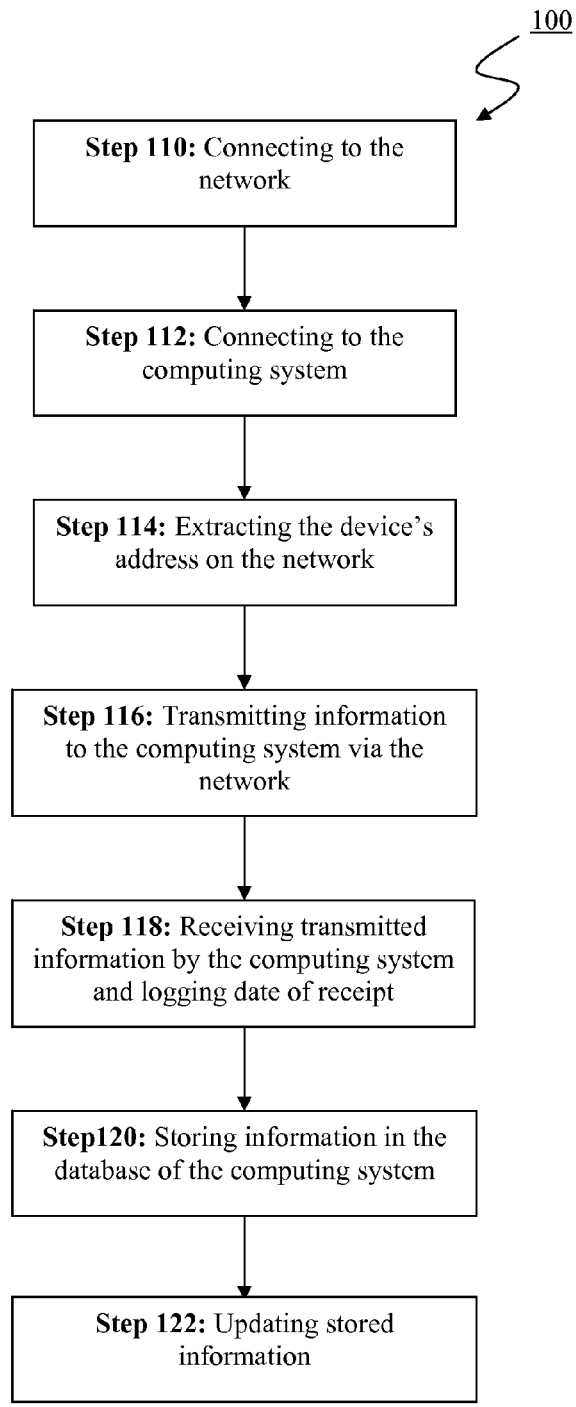
FIG. 5 illustrates a partial process flowchart of a method for information transmission, storage and update implementable by the computer peripherals device as according to another embodiment of the invention.

The computing system 30 further comprises a database 38 for storing information transmitted by the PD 20. A method 100 of information transfer, storage and update according to another embodiment of the invention is implementable by the PD 20. The method 100 is illustrated in FIG. 5. Preferably, the software program 28 that is stored on the storage module 22 of the PD 20 is implementable as a firmware and executable for performing the method 100. More preferably, the software program 28 of the PD 20 is executable for allowing a user to input information into the PD 20.

The method 100 comprises a step 110 of connecting the PD 20 to the network 32. This connection preferably occurs via the network access module 34. Upon detection of connection to the network 32, the PD 20 then initiates further connection and communication with the computing system 30 in a step 112.

Once the PD 20 is connected and in communication with the computing system 30, the PD 20 then extracts its own address on the network 32 in a step 114. Such an extraction step is well established in the art. The extracted address is an Internet protocol (IP) address of the PD 20 on the network 32, and is also known as a network address. Preferably, the address is directly associated with the PD 20 on the network. Alternatively, the address is that of the secondary device 36 that the PD 20 is coupled to or in signal communication with. The secondary device 36 is for example a secondary computing system.

In a step 116, the PD 20 transmits the extracted network address and the unique identification 26 to the computing system 30. This transmission preferably occurs via the network 32. Preferably, the extracted network address and the unique identification 26 are transmitted together as a data packet to the computing system 30.

In a step 118 of the method 100, the computing system 30 receives the transmitted data packet. A corresponding date of receipt of the data packet is also logged by the computing system 30. Information contained within the data packet is stored within the database 38 in a step 120. Preferably, the information contained within the data packet allows the computing system 30 to determine the PD's identity. More preferably, the information contained within the data packet aids the computing system 30 in tracking the PD's network location and a corresponding physical location.

Ability of the computing system 30 to determine the identity and the network address of the PD 20 from the information contained within the data packet aids a company in tracking the location of each of a large number of distributed computer peripheral devices. This is because the extracted network address usually differs depending on country that the PD 20 is used or located in. This location tracking ability therefore helps the company to verify international shipping orders as well as provides indication and information on occurrence of any undesired parallel importing activity.

Preferably, the logging of the date of receipt of the data packet by the computing system 30 enables the computing system 30 to allocate or activate a warranty start date for the PD 20. More preferably, the allocation or activation of the warranty start date is performed automatically upon receipt of the data packet from the PD 20 for the first time. Ability of the computing system 30 to allocate or activate the warranty start date of the PD 20 facilitates verification of warranty details (for example warranty validity period) of the PD 20 by the company that is utilizing the computing system 30. This ability thereby enables a significant reduction or even an elimination of unintended extension of the PD's warranty validity period caused by a false declaration of the warranty start date.

The software program 28 is further executable for facilitating input of information into the PD 20 by the user. For example, the software program 28 can be executed for allowing input of information into the PD 20 upon the PD's connection with the computer. The information is for example the PD's user information or user profile. The PD's user information or user profile can be stored within the storage module 22 of the PD 20. Alternatively, the PD's user information or user profile can be transmitted via the network 32 to the computing system 30 within the data packet.

Transmitted user information or user profile can be stored in the database 38. Preferably, the software program 28 is further executable for facilitating update of stored information in a step 122 of the method 100. This allows stored user information or user profile to be updated or amended as and when required. The step 122 of updating stored information can be performed directly on information stored within the storage module 22. Alternatively, if the PD 20 is connected to the computing system 30, the step 122 can be performed on stored information within the database 38.

The software program 28 is executable for facilitating retrieval of stored information from the storage module 22 of the PD 20. In addition, the software program 28 is further executable for allowing a retrieval of stored information from the database 38.

The PD 20 preferably enables tracking of usage of the PD's user. Such usage information or data includes user network activities, for example user frequented websites and online games, time and duration of PD 20 usage as well as programs accessed or utilized by the user. Preferably, the software program 28 is executable for enabling tracking of usage information upon connection of the PD 20 to the computer.

Usage information can be stored in the storage module 22. Preferably, the data packet transmitted to the computing system 30 via the network 32 further comprises the usage information. Encoding the usage information within the data packet enables transmission of the usage information to the computing system 30 for processing thereby as well as for storage within the database 38. Alternatively, the usage information is stored in both the storage module 22 and the database 38. Storing information in both the storage module 22 as well as in the database 38 provides a potentially useful backup for the information.

The computing system 30 is able to process the usage information for use as analytics. The usage information raw data, processed usage information and the resultant analytics can be stored within the database 38. The database 38 is preferably accessible by a third party. The third party is for example a games developer, an advertiser or a network service provider. The third party accesses the database 38 and thereafter utilizes the information stored therein for a variety of purposes.

For example, the games developer is able to analyze the stored information in the database 38 to assess relative popularity of different game distributors for thereafter improving distribution or marketing strategy.

Likewise, the advertiser is able to analyze stored information in the database 38 to assess the relative popularity of different websites in order to enhance advertisements' visibility. In addition, knowledge of PD users' preferred network services and products enables network service providers to provide individual PD users with a more relevant service or product update and to thereby increase PD users' satisfaction.

Users' games settings and preferences can also be stored in the PD 20. Preferably, the games' settings and preferences are stored within the storage module 22 of the PD 20. Alternatively, the games' settings and preferences are transmitted via the network 32 to the computing system 30 as a constituent of the data packet. In this alternate scenario, the games' settings and preferences is preferably stored in the database 38. The software program 28 of the PD 20 is further executable for retrieving the stored games' settings and preferences from the storage module 22 or from the database 38 as and when required by the user of the PD 20.

Furthermore, the PD 20 is capable of receiving a software program, firmware and/or driver update or upgrade from the computing system 30. Preferably, the PD 20 receives the software program, firmware and driver update or upgrade automatically upon connection with the computing system 30. Alternatively, the software program 28 is further executable for enabling the user of the PD 20 to initiate and/or control the receipt of the software program, firmware and driver update or upgrade.

As previously mentioned, the computing system 30 is able to determine the identity of the PD 20 from the unique identification 26 transmitted by the PD 20. In addition, the computing system 30 is able to determine the PD's software program 28 status. More particularly, the computing system 30 is able to determine whether the PD 20 has received a latest software program, firmware or driver update or upgrade.

Preferably, the status of the software program 28 is determined in relation to information stored within the database 38. For example, the computing system 30 is preferably able to determine if the PD 20 has the latest software program, firmware or driver update by comparing the current software program, firmware or driver status of the PD 20 with a corresponding table in the database 38 which lists all latest software program, firmware and driver updates and upgrades.

If the PD 20 lacks the latest software program, firmware or driver update or upgrade, the computing system 30 then supplies the latest software program, firmware or driver update to the PD 20. Detection of absence of latest software program, firmware or driver update or upgrade within the PD 20 is preferably performed automatically upon connection of the PD 20 with the computing system 30. The supply or download of the latest software program, firmware or driver update or upgrade is also preferably performed automatically upon connection of the PD 20 with the computing system 30.

The ability to automatically detect the absence of the latest software program, firmware or driver update or upgrade on the PD 20, and to thereafter automatically supply the absent latest software program, firmware or driver update or upgrade from the computer system 30 onto the PD 20 saves the PD user time that is otherwise required for, and spent, manually checking for and installing such an update or upgrade.

Preferably, a switch located on the PD 20 and operable by the PD user allows selection thereby between enablement and disenablement of automatic detection and download of the latest software program, firmware or driver update or upgrade to the PD 20.

As above mentioned, the download or supply of the latest software program, firmware or driver update or upgrade can be under the control of the PD user. The software program 28 is preferably executable for enabling the PD user to browse through the table of latest software program, firmware or driver updates and upgrades. Such browsing capability is for example performed via the computer to which the PD 20 is connected. The software program 28 is also further executable for enabling the PD user to selectively choose and download any latest software program, firmware or driver update or upgrade listed in the table as desired. Additionally, the software program 28 can be programmed to alert the user of the PD 20 as and when an available update for the software program, firmware or driver is introduced onto computing system 30 or in the database 38.

In the foregoing manner, a PD and a method for information transmission, storage and update implementable by the PD are described according to exemplary embodiments of the invention for addressing the foregoing shortcomings of existing computer peripheral devices. Although only a number of embodiments of the invention are disclosed in this document, it will be apparent to one skilled in the art in view of this disclosure that numerous changes and/or modifications can be made to the disclosed embodiments without departing from the scope and spirit of the invention.

The invention claimed is:

1. A computer input device selected from a group consisting of a computer mouse, a joystick, and a keyboard, the computer input device couplable for use with a computer, the computer input device comprising:

a storage module comprising a solid state memory device;

an identifier for uniquely identifying the computer input device, the identifier being a unique serial number and stored on the solid state memory device of the storage module;

a software program stored on the solid state memory device, the software program executable to receive input of a user profile by a user of the computer input device, the user profile thereafter stored within the solid state memory device; and a controller for establishing communication with a computing system over a network when the computer input device is coupled to the network, the controller adapted for obtaining an Internet Protocol (IP) address on the network when the computer input device is coupled to the network, the IP address associated with the computer input device, and corresponding to a physical location;

wherein the identifier, the user profile and the IP address are transmitted by the controller as a data packet to the computing system for updating a database on the computing system upon communication being established with the computing system.

2. The computer input device as in claim 1, wherein the identifier is a series of at least one of alphanumeric characters, numeric characters and letters of the alphabet.

3. The computer input device as in claim 1, the controller comprising:

a processor; and a network access module for interfacing the processor with to thereby enable communication between the computer input device and the computing system over the network.

4. The computer input device as in claim 3, further comprising:

a socket for connecting the network access module to the network.

5. The computer input device as in claim 1, further comprising:

an interface for coupling the controller to a network access module of a secondary device when the computer input device is connected to the secondary device, wherein the network access module is controllable by the controller for interfacing the controller with the network therethrough.

6. The computer input device as in claim 1, wherein the network is one of the Internet, a local area network (LAN) and a wide area network (WAN).

7. The computer input device as in claim 1, further comprising:

at least one actuator being actuable for generating actuation signals; and a displacement transducer for detecting and transducing displacement into displacement signals, wherein the computer input device is signal couplable to a computing device for communicating the actuation signals and the displacement signals thereto.

8. The computer input device as in claim 1, further comprising:

receiving data from the computing system, the received data being stored in the solid state memory device of the storage module of the computer input device.

9. A method comprising:

providing an identifier, the identifier being a unique serial number for identifying a computer input device couplable for use with a computer and selected from a group consisting of a computer mouse, a joystick, and a keyboard, the identifier stored in a solid state memory device of a storage module of the computer input device;

receiving input of a user profile by a user of the computer input device with a software program stored on the solid state memory device, the user profile thereafter stored within the solid state memory device;

detecting connection between the computer input device and a network;

initiating communication between the computer input device and a computing system in response to the computer input device being connected to the network;

determining an IP address of the computer input device on the network, the IP address corresponding to a physical location; and transmitting the IP address, the user profile and the identifier as a data packet to the computing system for updating a database on the computing system.

10. The method as in claim 9, wherein the identifier is a series of at least one of alphanumeric characters, numeric characters and letters of the alphabet.

11. The method as in claim 9, detecting connection between the computer input device and the network comprising:

providing a network access module in the computer input device;

interfacing the network access module with the network; and detecting connection between the network access module and the network.

12. The method as in claim 9, further comprising:
receiving data from the computing system by the computer input device.

13. The method as in claim 9, further comprising:
receiving user preferences provided by a user of the computer input device;
storing the user preferences in the solid state memory device; and
transmitting the user preferences to the computing system when the computer input device is connected to the network.

14. The method as in claim 9, further comprising:
detecting a network activity usage of the computer to which the computer input device is coupled to;
generating network activity usage data from the detected network activity usage of the computer; and
transmitting the network activity usage data to the computing system.

15. The method as in claim 9, wherein the network is one of the Internet, a local area network (LAN) and a wide area network (WAN).

16. A computer implemented method comprising:
detecting communication between a computer input device and a computing system over a network, the computer input device couplable for use with a computer and selected from a group consisting of a computer mouse, a joystick, a keyboard, and a gaming console;
receiving an IP address, a user profile, and an identifier as a data packet from the computer input device by the computing system, the identifier being a unique serial number for uniquely identifying the computer input device, the user profile received from a user of the computer input device through a software program stored, both the identifier and the user profile stored in a solid state memory device of a storage module of the computer input device, and the IP address indicating location of the computer input device on the network, the IP address being obtainable by the computer input device upon coupling thereof to the network;
determining a physical location of the computer input device using the IP address; and
updating a database with the IP address, the user profile, at least one of time and date of receipt of the address, the user profile and the identifier by the computing system, and the physical location of the computer input device.

17. The method as in claim 16, wherein the identifier is a series of at least one of alphanumeric characters, numeric characters and letters of the alphabet.

18. The method as in claim 16, wherein the network is one of the Internet, a local area network (LAN) and a wide area network (WAN).

19. The method as in claim 16, detecting communication between the computer input device and the computing system over the network comprising:
detecting connection between a network access module and the computing system.

20. The method as in claim 16, further comprising:
receiving user preferences by the computing system from the computer input device, the user preferences being provided by a user of the computer input device; and
storing the received user preferences in a storage module of the computing system.

21. The method as in claim 16, comprising:
providing an interface for enabling one of accessing and editing of the user profile stored in the database.

22. The method as in claim 16, further comprising:
receiving network activity usage data from the computer input device by the computing system, the network activity usage data being generated by the computer input device in response to network activity usage of the computer to which the computer input device is coupled to; and
storing the network activity usage data in the storage module of the computing system.

23. The method as in claim 22, further comprising:
generating analytics from the network activity usage data.

24. The method as in claim 16, further comprising:
providing at least one update;
providing an indication in the database of one of presence and absence of the at least one update associated with the identifier; and
transmitting the at least one update to the computer input device in response to absence of the at least one update being indicated by the database.

25. The method as in claim 24, the at least one update being one of a software update, a firmware update and a driver update.

26. The method as in claim 16, further comprising:
recording the at least one of time and date of receipt of the IP address, the user profile and the identifier by the computer system as at least one of a start time and a start date of a warranty duration associated with the computer input device.

27. A computer input device-readable medium having stored therein a plurality of programming instructions, which when executed, the instructions cause the computer input device to:
detect connection with a network;
initiate communication with a computing system on the network in response to connection with the network;
obtain an IP address on the network, the IP address being associated with the computer input device corresponding to a physical location; and
transmit the IP address, a user profile received from a user of the computer input device, and an identifier as a data packet to the computing system when connected to the network,
wherein the computer input device is couplable for use with a computer and selected from a group consisting of a computer mouse, a joystick, and a keyboard, the identifier being a unique serial number for uniquely identifying the computer input device and stored in a solid state memory device of a storage module of the computer input device.

28. The computer input device-readable medium as in claim 27, wherein the identifier is a series of at least one of alphanumeric characters, numeric characters and letters of the alphabet.

29. The computer input device-readable medium as in claim 27, wherein the connection between the computer input device and the network is facilitated by a network access module in the computer input device.

30. The computer input device-readable medium as in claim 27, wherein the plurality of programming instructions, which when executed, the instructions cause the computer input device to:
receive data from the computing system.

31. The computer input device-readable medium as in claim 27, wherein the plurality of programming instructions, which when executed, the instructions cause the computer input device to:

receive user preferences provided by a user of the computer input device; and transmit the user preferences to the computing system.

32. The computer input device-readable medium as in claim 27, wherein the plurality of programming instructions, which when executed, the instructions cause the device to:

detect a network activity usage of the computer to which the computer input device;

generate network activity usage data from the detected network activity usage of the computer; and transmit the network activity usage data to the computing system.

33. The computer input device-readable medium as in claim 27, wherein the network is one of the Internet, a local area network (LAN) and a wide area network (WAN).

34. A machine-readable medium having stored therein a plurality of programming instructions, which when executed, the instructions cause the machine to:

connect to a network for establishing communication between the machine and a computer input device, the computer input device couplable for use with a computer and selected from a group consisting of a computer mouse, a joystick, and a keyboard;

receive an IP address, a user profile received from a user of the computer input device, and an identifier as a data packet from the computer input device, the identifier being a unique serial number for uniquely identifying the computer input device and stored in a solid state memory device of a storage module of the computer input device, and the IP address for indicating location of the computer input device on the network and corresponding to a physical location of the computer input device, the IP address being obtainable by the computer input device upon coupling thereof to the network; and update a database with the IP address, the user profile and the identifier and at least one of time and date of receipt of the IP address, the user profile and the identifier by the machine.

35. The machine-readable medium as in claim 34, wherein the identifier is a series of at least one of alphanumeric characters, numeric characters and letters of the alphabet.

36. The machine-readable medium as in claim 34, wherein the network is one of the Internet, a local area network (LAN) and a wide area network (WAN).

37. The machine-readable medium as in claim 34, wherein communication with the computer input device over the network is facilitated by a network access module.

38. The machine-readable medium as in claim 34, wherein the plurality of programming instructions, which when executed, the instructions cause the machine to:

receive user preferences from the computer input device, the user preferences being provided by a user of the computer input device; and store the received user preferences in a storage module of the machine.

39. The machine-readable medium as in claim 34, wherein the plurality of programming instructions, which when executed, the instructions cause the machine to:

provide an interface for enabling one of accessing and editing of the user profile stored in the database.

40. The machine-readable medium as in claim 34, wherein the plurality of programming instructions, which when executed, the instructions cause the machine to:

receive network activity usage data from the computer input device, the network activity usage data being generated by the computer input device in response to network activity usage of the computer to which the computer input device is coupled to; and store the network activity usage data in the storage module of the computing system.

41. The machine-readable medium as in claim 40, wherein the plurality of programming instructions, which when executed, the instructions cause the machine to:

generate analytics from the network activity usage data.

42. The machine-readable medium as in claim 34, wherein the plurality of programming instructions, which when executed, the instructions cause the machine to:

provide at least one update;

provide an indication in the database of one of presence and absence of the at least one update associated with the identifier; and transmit the at least one update to the computer input device in response to absence of the at least one update being indicated by the database.

43. The machine-readable medium as in claim 42, the at least one update being one of a software update, a firmware update and a driver update.

44. The machine-readable medium as in claim 34, wherein the plurality of programming instructions, which when executed, the instructions cause the machine to:

record the at least one of time and date of receipt of the IP address, the user profile and the identifier by the machine as at least one of a start time and a start date of a warranty duration associated with the computer input device.

45. The computer input device as in claim 1, wherein the software program stored is executable to at least one of store user preferences on the solid state memory device, track user network activity, and track warranty information corresponding to the computer input device.

46. The computer input device as in claim 1, wherein a user's game settings can be stored in at least one of the solid state memory device of the computer input device and a database of the computing system, the software program executable to at least one of retrieve and update the user's game settings that are stored in the at least one of the storage device of the computer input device and the database of the computing system.

47. The method as in claim 9, wherein the software program is executable to at least one of store user preferences on the solid state memory device, track user network activity, and track warranty information corresponding to the computer input device.

48. The method as in claim 9, the software program executable to enable storing a user's game settings in at least one of the solid state memory device of the computer peripheral device and a database of the computing system, the software program being further executable to at least one of retrieve and update the user's game settings that are stored in the at least one of the solid state memory device of the computer peripheral device and the database of the computing system.

49. The computer input device as in claim 3, wherein the network access module is configured to independently communicate with the computing system over the network.

50. A computer input device selected from a group consisting of a computer mouse, a joystick, a keyboard, and a gaming console, the computer input device comprising:

a storage module comprising a solid state memory;

an identifier for uniquely identifying the computer input device, the identifier being a unique serial number and stored on the solid state memory of the storage module;

a software program stored on the solid state memory device, the software program executable to receive input of a user profile by a user of the computer input device, the user profile thereafter stored within the solid state memory device;

a controller comprising a network access module configured to independently establish communication with a computing system over a network, the controller adapted to obtain an IP address on the network upon establishment of communication between the network access module and the computing system, the IP address associated with the computer input device and corresponding to a physical location;

wherein the identifier, the user profile and the IP address are transmittable as a data packet to the computing system for updating a database on the computing system upon establishment of communication between the network access module and the computing system.

51. The computer input device as in claim 50, wherein the software program is executable to at least one of store user preferences on the solid state memory device, track user network activity, and track warranty information corresponding to the computer input device.

52. The computer input device as in claim 50, further comprising:

at least one actuator being actuable for generating actuation signals; and a displacement transducer for detecting and transducing displacement into displacement signals, wherein the network access module is configured to communicate the actuation signals and the displacement signals to the computing system.

53. A system comprising:

a network;

a computer peripheral device coupled to the network and associated with a user, the computer peripheral device comprising:

a storage module including a solid state memory device storing an identifier being a unique serial number for uniquely identifying the computer peripheral device, a user profile received from a user, and a software program; and a controller for executing the software program, obtaining an IP address on the network when the computer peripheral device is coupled to the network, the IP address associated with the computer peripheral device and corresponding to a physical location, establishing network communication with a computer, and transmitting the address and the identifier to the computer upon the establishing network communication with the computer; and a computer system coupled to the network, the computer system comprising a computer coupled to a database, the computer system configured for communicating with the computer peripheral device over the network, receiving the identifier from the computer peripheral device, storing the identifier in a database, and at least one of (a) tracking the computer peripheral device's network location and corresponding physical location, and (b) allocating a warranty start date for the computer peripheral device.

54. The system of claim 53, wherein the software program is executable by the controller for storing computer peripheral device usage information and communicating the computer peripheral device usage information to the computer system, the computer peripheral device usage information comprising user network activities.

55. The system of claim 54, wherein the computer system is further configured for processing the computer peripheral device usage information and storing resultant analytics in the database.

* * * * *